Aug. 24, 1954  E. SHURTS  2,687,112
TEAT CUP INFLATION
Filed March 6, 1950  2 Sheets-Sheet 2
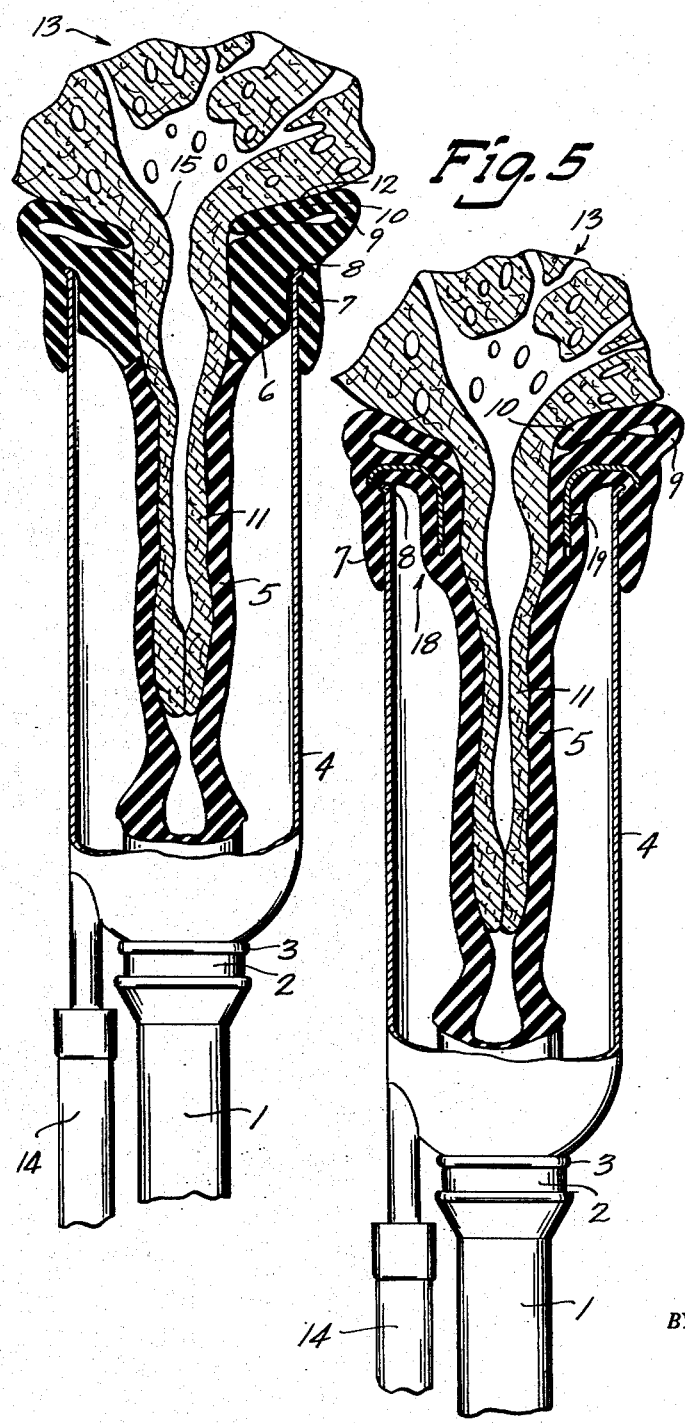
INVENTOR.
Englebert Shurts
BY
David A. Fox
Attorney

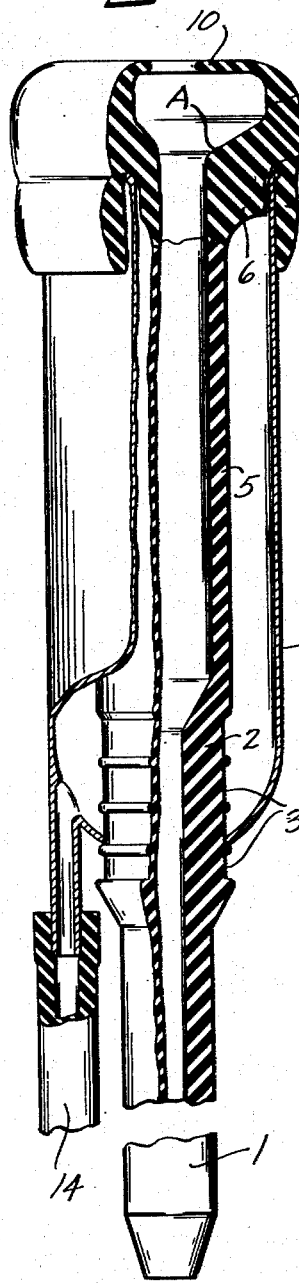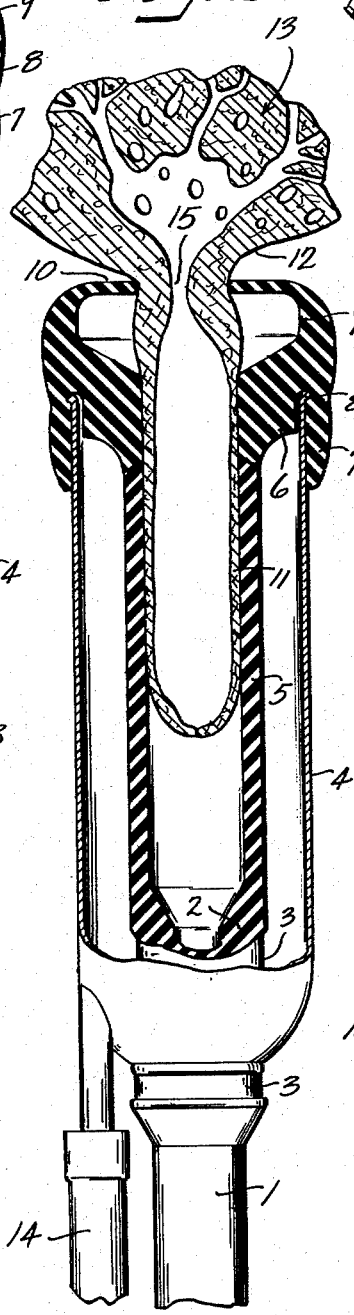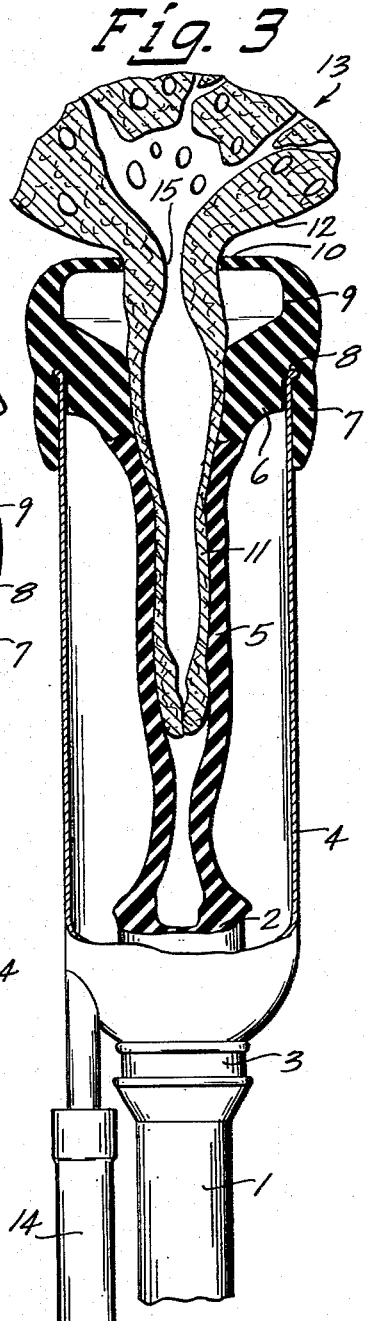

Patented Aug. 24, 1954

2,687,112

UNITED STATES PATENT OFFICE 2,687,112

TEAT CUP INFLATION

Englebert Shurts, Waukesha, Wis.

Application March 6, 1950, Serial No. 147,903

5 Claims. (Cl. 119—14.49)

This invention relates to milking machine inflations and it resides in an improvement therein wherein the upper end of the inflation is provided with a relatively non-collapsible collar forming an entrance to the inflation through which the teat is inserted which non-collapsible collar merges with the yieldable inflation sleeve proper disposed therebelow to provide an inactive entrance zone which prevents undue and harmful massaging of the annular fold and surrounding tissue standing between the teat and the udder.

Heretofore milking machines quite generally have used resilient yieldable inflations, contained within rigid shells, as the means by which milking attachment to the cow is made. The inflations heretofore used have been so constructed that they, in cooperation with the shell and the suction pulses applied thereto by the milking machine, collapse periodically to apply to the teat a massaging action. By reason of the suction applied to the interior of such inflations, to cause withdrawal of milk, the normal tendency of such inflations is to creep upwardly until the teat is completely enclosed and the entrance of the inflation abuts the udder. When such occurs, the periodic collapsing of the inflation, as heretofore constructed, at or in the near vicinity of the entrance, causes massaging to be imposed upon a portion of the teat and udder structure which is anatomically ill adapted to withstand such treatment. As a result cows so treated do not respond with a free letdown of milk and become hard milking. When this occurs, besides the inconvenience and expense of prolonged milking and the necessity for extensive hand stripping which is occasioned thereby, danger is incurred of loss of production and injury to the cow.

Inflations as heretofore constructed, including those provided with so-called vacuum rings, collapse during massaging at or in the near vicinity of the entrance because of the yieldable, resilient, thin-walled construction thereof in the near vicinity of the entrance. The action imposed thereby upon the annular fold, standing between the main milk sinus of the udder and the teat, is such as to compress or knead this specialized tissue and to cause periodic stoppage of the milk passage provided thereby. The morphological effect is such as to induce a predisposition toward congesting inflammation, or to aggravate inflammations otherwise already induced, and ultimately to bring about permanent structural changes. The physiological effect is likewise adverse. The milk letdown mechanism, involving as it does a complex hormone action upon a vast network of minute alveoli, is sensitive to sensations of discomfort, unnatural interference with refilling of the teat, and to the impeding or congestion of circulation which results from the improper compression of the annular fold. Slow milking and actual reduction of production follow these adverse effects.

It is the discovery of this invention that this undesirable action may be markedly reduced by the use of an improved inflation constructed in accordance with this invention. Through the proper use of the inflation of this invention, with attention directed toward the avoidance of over milking and with employment of the usual stimuli for milk letdown, the usual cow will become capable of being milked with exceptional rapidity and often without the need for hand stripping. At the same time the animal is subjected to a lesser probability of injury.

This invention is herein described by reference to the accompanying drawings forming a part hereof in which there is set forth by way of illustration and not of limitation certain forms in which inflations may be constructed in accordance with this invention.

In the drawings:

Fig. 1 is a side view in elevation with parts broken away and in section of an inflation constructed in accordance with this invention mounted in a rigid inflation shell, Fig. 2 is a side view in elevation and in section of the inflation and shell shown in Fig. 1, shown in relation to a teat and udder during a milking pulse, at the outset of milking, Fig. 3 is a side view in elevation and in section of the inflation and shell shown in Fig. 1, shown in relation to a teat and udder during a massaging pulse, at the outset of milking, Fig. 4 is a side view in elevation and in section of the inflation and shell shown in Fig. 1, shown in relation to a teat and udder during a massaging pulse, after milking has continued for a substantial interval, and Fig. 5 is a side view in elevation and in section of another form of inflation constructed in accordance with this invention showing the same in relation to a shell and to a teat and udder during a massaging pulse after milking has continued for a substantial interval.

The form of the inflation of this invention illustrated in Figs. 1 to 4 of the drawings comprises the usual flexible rubber milk tube 1 intended to be joined with the claw or junction fitting of a conventional milking machine. The upper end of the tube 1 merges with and is integrally joined to an enlargement or thickened wall portion 2 bearing shell engaging notches 3 intended to be drawn through and to tightly engage the lower opening in a metallic shell 4, to form a lower shell engaging abutment.

Rising from the thickened wall portion 2 and integrally joined therewith is an inflation cell proper 5. The cell 5 is composed of high grade resilient yieldable rubber, is of sufficient predetermined average diameter to accommodate but closely fit a cow's teat, and has a wall thickness thin enough to permit it to easily yield and collapse under moderate collapsing pressure. While the resistance of natural rubber to the action of butter fat and other milk constituents is not as great as might be desired, other properties of natural rubber outweigh this disadvantage. It is preferred therefore that the cell 5 be composed of the highest available grade of properly compounded natural vulcanized rubber although synthetic materials selected for good recovery properties may be employed with some success for this part.

The upper end of the cell 5 terminates at and is integrally joined with a resilient but relatively non-collapsible collar 6 of heavily reinforced cross section. The upper end of this collar 6 is open to receive the teat and this opening, which may be made more or less tapering if desired, is hereafter referred to as the "entrance" or effective "entrance opening" and is identified in Fig. 1 of the drawings by the reference character A. The collar 6 may be composed of the same material as the cell 5, depending upon the increased cross section thereof to prevent collapsing, but it is preferred that it be formed of a somewhat less easily deformed composition, such as one of the rubber-like, synthetic elastomers. It is important that the non-collapsible character of the collar 6 be preserved under conditions of prolonged use, and to this end the synthetic materials are preferred for this part.

About the collar 6, joined therewith, and extending laterally and then downwardly therefrom, is a return flap 7 which provides an airtight seat 8 for the upper rim of the shell 4, forming an upper shell abutment. Standing above the collar 6 and the seat 8 is an integrally joined extension 9 which turns inwardly at 10 to form the familiar vacuum ring or cushion top heretofore frequently employed to improve the sealing of the suction. The aperture in the cushion top 10 serves a supplementary purpose only, and is not to be confused with the "entrance opening" A which is formed by the top of the collar 6. If desired, the cushion top feature may be dispensed with in inflations constructed in accordance with this invention by simply omitting the parts 9 and 10. For convenience in molding, the parts 7, 9 and 10 are composed of material having the same properties as the non-collapsible collar 6 but such is not essential.

In the earlier stages of milking, as shown in Figs. 2 and 3, a teat 11 which has been entered into the inflation will be held by friction and the distending action of a nearly full udder, in a position short of full insertion of the teat. At such a stage the cushion top 10 of the inflation is spaced a substantial distance from the lower face 12 of the udder generally designated by the numeral 13. The milking action imposed by the milking machine, at this stage, causes periodic alternation between the conditions depicted in Figs. 2 and 3. Milk is withdrawn by the steady suction communicated through the milk tube 1 during the short intervals when suction is applied through the pulsator tube 14 to the space surrounding the cell 5, enclosed by the shell 4, as shown in Fig. 2. Between these intervals, the space surrounding the cell 5 is vented, whereupon it collapses to apply massaging pressure to the teat 11, as appears in Fig. 3. As will be noted in Fig. 3, the annular fold 15 joining the teat 11 to the udder 13 is, under such condition, well beyond the range of any massaging action.

As milking progresses the less distended teat 11 creeps downwardly sometimes to the point where the cushion top 10 is collapsed against the lower face 12 of the udder 13. In the case of inflations not provided with a cushion top this deep reception of the teat 11 occurs even more readily. In the case of an inflation constructed in accordance with this invention, as shown in Fig. 4, the deeply received teat is nevertheless held in such a position that the annular fold 15 is protected against massaging action by the non-collapsible collar 6. Massaging action, however, continues to be imposed upon the lower part of the teat so that milking can progress to completion.

By constructing the non-collapsible collar 6 in such form that it extends downwardly from the effective entrance opening A in the direction of the longitudinal axis of the inflation cell a distance approximating ½ the average inside diameter of the cell 5, the likelihood of imposing harmful massaging action upon the annular fold 15 is substantially precluded. The downward extension of the collar 6 may be reduced to as little as ⅓ the average inside diameter of the cell 5 without danger of adverse action upon all except certain comparatively rare malformed teat and udder structures. If the downward extension of the collar 6 exceeds one and one-half times the average inside diameter of the cell 5, massaging action, particularly at the outset of milking, may be so diminished as to render the same largely ineffective. Between these limits of downward extent for the collar 6 the benefits of this invention may be markedly realized, although for general all around results a downward extent for the non-collapsible collar 6, in the range of from ½ to 1 times the average inside diameter of the cell 5 is preferred.

The results obtainable through correct handling of the improved inflation of this invention are in many instances remarkable, standing in an entirely distinct class. For example, an animal otherwise normal, which has not yet suffered permanent damage, but which is slow milking by reason of the action of older inflations may require as much as 10 minutes of machine milking and considerable hand stripping for a complete milking even though a warm water wash to stimulate letdown is properly applied. With a change to the inflation of this invention and with milking time limited to avoid overmilking the animal after two or three days, in most instances, begins to respond with such a rate of letdown that the milking thereafter can be completed in about two minutes without any hand stripping. So pronounced is the contrast that special care must be exercised to recognize and avoid a condition of overmilking since the effect of overmilking itself may be highly injurious and at least conducive to the continuance of slow letdown characteristics in the animal.

If desired, the inflation of this invention may be constructed to provide a non-collapsible entrance collar of the form illustrated in Fig. 5. In this form of the inflation of this invention the inflation cell 5 joins with a comparatively light walled entrance collar 18 provided with a metallic re-enforcing insert 19. The insert may act simply as a lining for the upper part of the inflation, but it is preferably embedded in the rubber substance itself as shown. When constructed in this form the advantages and results noted above are obtained but the construction is more expensive and less durable.

I claim:

1. In a milking machine inflation a resilient milk tube having a lower shell engaging abutment at its upper end; a thin-walled, resilient, yieldable inflation cell integrally joined in communication with and extending in line with the longitudinal axis of the milk tube upwardly from said lower shell engaging abutment; a non-collapsible less resilient collar of substantially thicker cross section than that of said thin-walled inflation cell forming an integral upward extension of said inflation cell terminating at an entrance opening and forming an upper shell engaging abutment, the downward extent of said collar from the entrance opening being equal to ½ to 1 times the internal diameter of said cell; and a resilient cushion top joined with and extending upwardly from said collar.

2. In a milking machine inflation including a teat cup shell having an open upper teat receiving end and a lower milk tube receiving end; a milk tube having a shell engaging abutment at its upper end for engaging the lower milk tube receiving end of said shell; a thin-walled, resilient, yieldable inflation cell of predetermined average diameter merged with and extending upwardly within said shell from said shell engaging abutment; and a non-collapsible, less resilient collar merged with and extending upwardly from said cell and terminating in an entrance opening at the upper teat receiving end of said shell; the downward extent of said collar from the entrance opening in the direction of the longitudinal axis of the inflation cell being from one-half to one times the average diameter of said cell.

3. In a milking machine inflation a milk tube having a thick-walled lower shell engaging abutment at its upper end; a thin-walled, resilient, yieldable, hollow, upwardly extending inflation cell of predetermined average diameter joined with and extending upwardly from said shell engaging abutment; and a non-collapsible, less resilient collar of substantially thicker cross-section than that of said thin walled inflation cell integrally joined with and extending upwardly in line with the longitudinal axis of the inflation cell from the top of said inflation cell terminating at an entrance opening and providing an upper shell engaging abutment; the downward extent of said collar from the entrance opening being from one-third to one and one-half times the average diameter of said cell.

4. In a milking machine inflation a thin-walled resilient yieldable inflation cell; a collar joined with and extending upwardly from said inflation cell and terminating in a teat receiving entrance opening; and a non-resilient, non-collapsible insert imbedded within said collar in supporting relationship thereto providing a non-collapsible entrance collar the extent of which collar in the direction of the longitudinal axis of the inflation cell is from ½ to 1 times the internal diameter of said cell.

5. In a milking machine inflation having a resilient yieldable inflation cell with an upper entrance opening the combination therewith of a non-collapsible collar at the upper end of said cell adjacent said entrance opening, said collar being formed by a non-resilient metallic insert disposed in supporting relationship to the upper part of said cell and having an extent downwardly from the entrance opening in the direction of the longitudinal axis of the inflation cell which is equal to from ½ to 1 times the internal diameter of said inflation cell.

References Cited in the file of this patent

UNITED STATES PATENTS

| Number | Name | Date |
| --- | --- | --- |
| 950,145 | Shafer | Feb. 22, 1910 |
| 1,220,172 | Berthelsen | Mar 27, 1917 |
| 1,945,386 | Stampen | Jan. 30, 1934 |
| 2,055,718 | Davis | Sept. 29, 1936 |
| 2,092,605 | Hodsdon | Sept. 7, 1937 |
| 2,484,696 | Dinesen | Oct. 11, 1949 |
| 2,502,956 | Jansson | Apr. 4, 1950 |
| 2,541,988 | Cyphers | Feb. 20, 1951 |

FOREIGN PATENTS

| Number | Country | Date |
| --- | --- | --- |
| 491,694 | Great Britain | Sept. 7, 1938 |
| 587,646 | Great Britain | May 1, 1947 |